US010435552B2

(12) United States Patent
Lecouvet et al.

(10) Patent No.: US 10,435,552 B2
(45) Date of Patent: *Oct. 8, 2019

(54) PROCESS FOR MANUFACTURE OF LOW EMISSION POLYPROPYLENE

(71) Applicant: SABIC Global Technologies B.V., Bergen op Zoom (NL)

(72) Inventors: Benoit Thérèse Philippe Lecouvet, Schaerbeek (BE); Aurora Alexandra Batinas-Geurts, Sittard (NL); Rick Robert Emilie Bercx, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 23 days.

This patent is subject to a terminal disclaimer.

(21) Appl. No.: 15/579,832

(22) PCT Filed: Jun. 6, 2016

(86) PCT No.: PCT/EP2016/062740
§ 371 (c)(1),
(2) Date: Dec. 5, 2017

(87) PCT Pub. No.: WO2016/198344
PCT Pub. Date: Dec. 15, 2016

(65) Prior Publication Data
US 2018/0155536 A1  Jun. 7, 2018

(30) Foreign Application Priority Data

Jun. 12, 2015 (EP) .................... 15171854
Oct. 2, 2015 (EP) .................... 15188160

(51) Int. Cl.
*C08L 23/12* (2006.01)

(52) U.S. Cl.
CPC ........... *C08L 23/12* (2013.01); *C08L 2205/02* (2013.01); *C08L 2207/02* (2013.01)

(58) Field of Classification Search
CPC ...... C08L 23/12; C08L 23/08; C08L 2205/02; C08L 2207/02; C08L 23/0815
See application file for complete search history.

(56) References Cited

U.S. PATENT DOCUMENTS

| 4,282,076 A | 8/1981 | Boynton |
| 4,414,132 A | 11/1983 | Goodall et al. |
| 4,771,024 A | 9/1988 | Nestlerode et al. |
| 4,866,022 A | 9/1989 | Arzoumanidis et al. |
| 4,978,648 A | 12/1990 | Barbe et al. |
| 5,077,357 A | 12/1991 | Job |
| 5,093,415 A | 3/1992 | Brady, III et al. |
| 5,106,806 A | 4/1992 | Job |
| 5,556,820 A | 9/1996 | Funabashi et al. |
| 6,218,504 B1 | 4/2001 | Dolle et al. |
| 6,395,670 B1 | 5/2002 | Morini et al. |
| 6,825,146 B2 | 11/2004 | Kilty et al. |
| 9,255,166 B2 * | 2/2016 | Grein et al. .......... C08F 210/06 |
| 9,464,144 B2 | 10/2016 | Gonzalez et al. |
| 2010/0130709 A1 | 5/2010 | Chen et al. |
| 2016/0326355 A1* | 11/2016 | Marques Ferreira Custodio et al. ................ C08L 23/12 |

FOREIGN PATENT DOCUMENTS

| EP | 0019330 A | 11/1980 |
| EP | 0063654 A1 | 11/1982 |
| EP | 0398698 A2 | 11/1990 |
| EP | 1222214 B1 | 7/2002 |
| EP | 1273595 A1 | 1/2003 |
| EP | 1283222 A1 | 2/2003 |
| EP | 2108679 A1 | 10/2009 |
| EP | 1838741 B1 | 4/2011 |
| GB | 1272778 A | 5/1972 |
| WO | 9632426 A1 | 10/1996 |
| WO | 9632427 A1 | 10/1996 |
| WO | 0123441 A1 | 4/2001 |
| WO | 0136502 A1 | 5/2001 |
| WO | 02088194 A1 | 11/2002 |
| WO | 03068828 A1 | 8/2003 |
| WO | 2004039848 A1 | 5/2004 |
| WO | 2006056338 A1 | 6/2006 |
| WO | 2007134851 A1 | 11/2007 |
| WO | 2008074423 A1 | 6/2008 |
| WO | 2009080821 A2 | 7/2009 |
| WO | 2009129873 A1 | 10/2009 |
| WO | 2010078480 A1 | 7/2010 |
| WO | 2011008589 A1 | 1/2011 |
| WO | 2012116719 A1 | 9/2012 |
| WO | 2013074087 A1 | 5/2013 |
| WO | 2013124063 A1 | 8/2013 |

(Continued)

OTHER PUBLICATIONS

Third Party Observations for European Application No. EP16727194. 9; Filed with the EPO dated Dec. 27, 2017; 11 Pages.

(Continued)

*Primary Examiner* — Nathan M Nutter

(74) *Attorney, Agent, or Firm* — Cantor Colburn LLP

(57) ABSTRACT

The present invention relates to a heterophasic propylene copolymer consisting of a propylene-based matrix and a dispersed ethylene-a-olefin copolymer, wherein the heterophasic propylene copolymer has a melt flow rate of at least 40 g/10 min as determined in accordance with ISO 1 133 (230° C., 2.16 kg) and a FOG value of at most 350 µg/g as determined by VDA 278.

21 Claims, No Drawings

(56) References Cited

FOREIGN PATENT DOCUMENTS

| WO | 2014044680 A1 | 3/2014 |
|---|---|---|
| WO | 2014044682 A1 | 3/2014 |
| WO | 2015091810 A1 | 6/2015 |
| WO | 2015091981 A2 | 6/2015 |
| WO | 2015091982 A1 | 6/2015 |
| WO | 2015150042 A1 | 10/2015 |

OTHER PUBLICATIONS

International Search Report for International Application No. PCT/EP2016/062740; International Filing Date: Jun. 6, 2106; dated Jul. 7, 2016; 3 Pages.
S. van der Ven, Polypropylene and other Polyolefins, Elsevier 1990, p. 8-10.
Written Opinion of the International Searching Authority for International Application No. PCT/EP2016/062740; International Filing Date: Jun. 6, 2106; dated Jul. 7, 2016; 4 Pages.

* cited by examiner

PROCESS FOR MANUFACTURE OF LOW EMISSION POLYPROPYLENE

CROSS REFERENCE TO RELATED APPLICATIONS

This application is a 371 of International Application No. PCT/EP2016/062740, filed Jun. 6, 2016, which claims priority to European Application Nos. 15188160.4, filed Oct. 2, 2015 and 15171854.1, filed Jun. 12, 2015 which are incorporated herein by reference in their entirety.

The present invention relates to a process for the manufacture of a heterophasic propylene copolymer having a target melt flow rate of from at least 40 g/10 min as determined in accordance with ISO 1133 (230° C., 2.16 kg) and having low FOG values as determined in accordance with VDA 278.

Heterophasic propylene copolymers, also known as impact propylene copolymers or propylene block copolymers, are an important class of polymers due to their attractive combination of mechanical properties, such as impact strength over a wide temperature range and their low cost. These copolymers find a wide range of applications ranging from the consumer industry (for example packaging and housewares), the automotive industry to electrical applications. One of the requirements for propylene polymers such as heterophasic propylene copolymers in automotive interior applications is that it has a relatively low emission of low molecular weight materials. In other words, such propylene polymers may contain only a very low amount of low molecular weight oligomers, because such low molecular weight materials can cause an unpleasant odor, a sticky feeling of the surface or may condense against windscreens thereby causing a reduced visibility.

One of the requirements related to such emission is laid down in the VDA 278 standard. The emission as determined in that standard is referred to as the FOG value. For example car manufacturers may require that the FOG value is typically at most 500 µg/g, more in particular at most 400 µg/g. With requirements becoming more strict in the future FOG values of at most 350 µg/g or even at most 250 µg/g are desirable.

Currently a method for reducing FOG emission involves maintaining polypropylene pellets or powders at a certain elevated temperature for a certain amount of time. For example polypropylene pellets or powders may be continuously fed to the top of a silo where the polypropylene is preferably contacted in counter-flow with a stream of hot gas, which may be for example nitrogen or dried air. At the bottom of the silo polypropylene having a reduced FOG value is then continuously withdrawn. This process is often referred to as venting, degassing or purging. It is noted that this venting, degassing or purging should not be confused with the removal of unreacted monomer as is usually carried out directly after polymerisation.

Venting, degassing or purging processes are disclosed for example in GB 1272778, WO 02/088194, WO2004/039848 and U.S. Pat. No. 6,218,504. Other methods to remove low molecular weight materials also exist, among which are steam stripping or chemical treatment.

A disadvantage of a venting step is that such an extra step adds cost to the final heterophasic propylene copolymer product. In particular it is noted that heterophasic propylene copolymers having a relatively high initial FOG value generally need to be maintained for a longer period of time in the venting equipment. Such a longer residence time not only increases the overall cost, but may also have a negative effect on the optical properties of the material in that the heterophasic propylene copolymer suffers from more yellowing due to partial thermal degradation.

Another trend in industry is down-gauging: the desire to more efficiently produce materials with at least a similar property profile, e.g. producing with less material and/or by using less energy. In order to use less energy for injection molding, a higher melt flow rate of the polymer, in this case heterophasic propylene copolymer is desired. A higher melt flow rate will enable faster injection molding and hence will reduce the energy needed per produced article. Also, it is a cost-effective solution as this allows for a shorter cycle time and therefore increases productivity.

However, typically a higher melt flow rate also increases the FOG due to the presence of a larger low molecular weight fraction, which fraction can be more easily emitted from a composition/article prepared therefrom.

It is therefore an object of the present invention to provide a heterophasic propylene copolymer having low FOG values and a high melt flow rate, while maintaining desirable mechanical and rheological properties.

Accordingly, the present invention provides a heterophasic propylene copolymer consisting of a propylene-based matrix and a dispersed ethylene-α-olefin copolymer, wherein the heterophasic propylene copolymer has a melt flow rate of at least 40 g/10 min as determined in accordance with ISO 1133 (230° C., 2.16 kg) and a FOG value of at most 350 µg/g as determined by VDA 278.

Preferably, the melt flow rate of the heterophasic propylene copolymer is at least 40 dg/min, for example at least 50 dg/min or at least 60 dg/min, and/or at most 90 dg/min, for example at most 80 dg/min or at most 70 dg/min (ISO 1133, 230° C., 2.16 kg). Preferably, the melt flow rate of the heterophasic propylene copolymer is 50-80 dg/min (ISO 1133, 230° C., 2.16 kg). The melt flow rate of at most 80 dg/min or at most 70 dg/min is advantageous for even more reduced FOG values.

Preferably, the heterophasic propylene copolymer of the invention is prepared according to the process for the manufacture of the heterophasic propylene copolymer as described herein.

In another aspect, the present invention provides a process for the manufacture of the heterophasic propylene copolymer according to the invention consisting of a propylene-based matrix and a dispersed ethylene-α-olefin copolymer, wherein the heterophasic propylene copolymer has a target melt flow rate of at least 40 g/10 min as determined in accordance with ISO 1133 (230° C., 2.16 kg) and a FOG value of at most 350 µg/g as determined by VDA 278, comprising the steps of:

I) polymerizing monomers to obtain an intermediate heterophasic propylene copolymer having an intermediate melt flow rate and II) visbreaking said intermediate heterophasic propylene copolymer, for example during extrusion directly after step I), to obtain the heterophasic propylene copolymer having said target melt flow rate and said FOG value and wherein the ratio of the target melt flow rate to the intermediate melt flow rate is more than 1, wherein step I) is performed in the presence of a catalyst system comprising a Ziegler-Natta catalyst and at least one external electron donor chosen from the group of a compound having a structure according to Formula III $(R^{90})_2$N—Si$(OR^{91})_3$, a compound having a structure according to Formula IV: $(R^{92})$Si$(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, preferably ethyl, methyl or n-propyl, more preferably wherein the at least one external electron donor is chosen from the group of diethylaminotriethoxysilane (DEATES), n-propyl triethoxysilane, (nPTES), n-propyl trimethoxysilane (nPTMS) and mixtures thereof.

For example, the catalyst system may be obtained by a catalyst preparation process comprising the steps of:
providing a magnesium-based support;
optionally activating said magnesium-based support;
contacting said magnesium-based support with a Ziegler-Natta type catalytic species, and optionally one or more internal electron donors to yield a procatalyst, and
contacting said procatalyst with a co-catalyst and the at least one external donor.

The steps I) and II) are carried out subsequently and preferably directly after one another. That is, step II) is carried out on the intermediate heterophasic propylene copolymer obtained directly from step I). It is noted however that step I) may include after the polymerisation the addition of common stabilisers for preventing the intermediate heterophasic propylene copolymer of step I) from degradation, such being well known to the skilled person.

WO 2014/044682 discloses a process for the preparation of a composition comprising a heterophasic propylene copolymer, a propylene copolymer and talc, wherein the composition has a desired melt flow index in the range of 1 to 200 dg/min as measured according to ISO 1133 (2.16 kg/230° C.) comprising the steps of
(a) melt-mixing a propylene copolymer with a talc to obtain a masterbatch
(b) melt-mixing the masterbatch with the heterophasic propylene copolymer and a peroxide to obtain the composition comprising a heterophasic propylene copolymer, a propylene copolymer and talc, wherein the amount of peroxide is chosen such that a composition comprising a heterophasic propylene copolymer, a propylene copolymer and talc having the desired melt flow index is obtained. However, the melt flow rate of the compositions of the examples of WO 2014/044682 are lower than desired for short cycle times in injection molding.

PCT/EP2015/055167, hereby incorporated by reference, describes a method for the manufacture of polypropylene having a target melt flow rate of from 10 to 200 g/10 min as determined in accordance with ISO 1133 (230° C., 2.16 kg) comprising the subsequent steps of
i) polymerizing propylene monomer, and optionally one or more alpha olefin comonomers so as to form a polypropylene having an initial melt flow rate of from 0.5 to 20 g/10 min (ISO 1133, 230° C., 2.16 kg),
ii) visbreaking said polypropylene of step i) to obtain polypropylene having said target melt flow rate and wherein the ratio of target to initial melt flow rate is more than 1
iii) maintaining the polypropylene obtained from step ii) at a temperature of at least 105° C. for a period of at least 48 hr. However, the FOG value for the high melt flow index heterophasic propylene copolymer of PCT/EP2015/055167 is still high.

EP2108679 discloses a polymer composition with low amounts of volatiles and fogging and good mechanical properties comprising a propylene homopolymer and an ethylene copolymer with one or more comonomers selected from α-olefins with 4 to 12 carbon atoms. However, EP2108679 does not disclose heterophasic propylene copolymers having a high MFR.

WO2009129873 discloses a high purity heterophasic polypropylene copolymers comprising (A) 73 to 98 wt % of a propylene homo- or copolymer matrix and (B) 2 to 27 wt % of an elastomeric copolymer, which is obtainable by a multistage polymerization process in the presence of a catalyst system comprising
(i) a Ziegler-Natta procatalyst which contains a trans-esterification product of a lower alcohol and a phthalic ester and
(ii) optionally an organometallic cocatalyst and (iii) an external donor. However, the FOG reported is in the range from 900 to 1500 µg/g.

Heterophasic Propylene Copolymer

It will be understood that the description of the heterophasic propylene copolymer in this section titled "heterophasic propylene copolymer" applies to both the intermediate heterophasic propylene copolymer obtained after step I) and the heterophasic propylene copolymer obtained after step II), unless otherwise stated.

Heterophasic propylene copolymers are generally prepared by polymerization of propylene (or propylene and α-olefin) in the presence of a catalyst and subsequent polymerization of an ethylene-α-olefin mixture. The resulting polymeric materials are heterophasic, but the specific morphology usually depends on the preparation method and monomer ratios used.

The intermediate heterophasic propylene copolymer according to present invention can be produced using any conventional technique known to the skilled person, for example gas phase polymerization.

The heterophasic propylene copolymer consists of a propylene-based matrix and a dispersed ethylene-α-olefin copolymer. The propylene-based matrix typically forms the continuous phase in the heterophasic propylene copolymer. The amounts of the propylene-based matrix and the dispersed ethylene-α-olefin copolymer may be determined by $^{13}$C-NMR, as well known in the art.

Preferably, the heterophasic propylene copolymer consists of
(a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and wherein the propylene-based matrix is present in an amount of 60 to 95 wt % based on the total heterophasic propylene copolymer and
(b) a dispersed ethylene-α-olefin copolymer,
wherein the dispersed ethylene-α-olefin copolymer is present in an amount of 40 to 5 wt % based on the total heterophasic propylene copolymer and
wherein the sum of the total amount of propylene-based matrix and total amount of the dispersed ethylene-α-olefin copolymer in the heterophasic propylene copolymer is 100 wt %.

The propylene-based matrix consists of a propylene homopolymer and/or a propylene-α-olefin copolymer consisting of at least 70 wt % of propylene and up to 30 wt % of α-olefin, for example ethylene, for example consisting of at least 80 wt % of propylene and up to 20 wt % of α-olefin, for example consisting of at least 90 wt % of propylene and up to 10 wt % of α-olefin, based on the total weight of the propylene-based matrix.

Preferably, the α-olefin in the propylene-α-olefin copolymer is selected from the group of α-olefins having 2 or 4-10 carbon atoms, for example ethylene, 1-butene, 1-pentene, 4-methyl-1-pentene, 1-hexene, 1-heptene or 1-octene, and is preferably ethylene.

Preferably, the propylene-based matrix consists of a propylene homopolymer.

The propylene-based matrix is present in an amount of 60 to 95 wt %, for example 65 to 85 wt %, for example 70 to 85 wt %, for example 70 to 80 wt %, for example 65 to 75 wt % or 75 to 85 wt % based on the total heterophasic propylene copolymer.

Besides the propylene-based matrix, the heterophasic propylene copolymer also comprises a dispersed ethylene-α-olefin copolymer. The dispersed ethylene-α-olefin copolymer is also referred to herein as the 'dispersed phase'. The dispersed phase is embedded in the heterophasic propylene copolymer in a discontinuous form. The particle size of the dispersed phase is typically in the range of 0.05 to 2.0 microns, as may be determined by transmission electron microscopy (TEM).

The dispersed ethylene-α-olefin copolymer is present in an amount of 40 to 5 wt %, for example in an amount of 35 to 15 wt % based on the total heterophasic propylene copolymer, for example in an amount of at least 20 wt % and/or for example in an amount of at most 30 wt % based on the total heterophasic propylene copolymer.

In the heterophasic propylene copolymer in the composition of the invention, the sum of the total weight of the propylene-based matrix and the total weight of the dispersed ethylene-α-olefin copolymer is 100 wt %.

Preferably, the amount of ethylene in the ethylene-α-olefin copolymer is in the range of 20 to 65 wt %, for example in the range of 40 to 60 wt % based on the ethylene-α-olefin copolymer, for example the amount of ethylene in the ethylene-α-olefin copolymer is at least 30 wt % and/or for example at most 55 wt % based on the ethylene-α-olefin copolymer.

The α-olefin in the ethylene-α-olefin copolymer is preferably chosen from the group of α-olefins having 3 to 8 carbon atoms and any mixtures thereof, preferably the α-olefin in the ethylene-α-olefin copolymer is chosen from the group of α-olefins having 3 to 4 carbon atoms and any mixture thereof, more preferably the α-olefin is propylene, in which case the ethylene-α-olefin copolymer is ethylene-propylene copolymer. Examples of suitable α-olefins having 3 to 8 carbon atoms, which may be employed as ethylene comonomers to form the ethylene α-olefin copolymer include but are not limited to propylene, 1-butene, 1-pentene, 4-methyl-1-pentene, 1-hexen, 1-heptene and 1-octene.

Step I)

The intermediate heterophasic propylene copolymer in the process according to the invention is prepared in step I). It is herein understood that the term 'intermediate heterophasic propylene copolymer' is a heterophasic propylene copolymer obtained directly after step I) before it is subjected to step II) visbreaking.

By step II) visbreaking, the final heterophasic propylene copolymer of the invention is produced. It is herein understood that the term 'final heterophasic propylene copolymer' is a heterophasic copolymer obtained after visbreaking.

Preferably, step I) involves

Ia) polymerizing propylene and optionally α-olefin in the presence of the catalyst system to obtain the propylene-based matrix and Ib) subsequently polymerizing ethylene and α-olefin in the propylene-based matrix in the presence of the catalyst system to obtain the dispersed ethylene-α olefin copolymer, for example in two or more reactors.

Preferably, steps Ia) and Ib) are performed in different reactors connected in series.

Preferably, the propylene-based matrix of the intermediate propylene copolymer has a melt flow rate of at most 70 dg/min, preferably at most 60 dg/min, preferably at most 50 dg/min, preferably at most 45 dg/min, preferably at most 40 dg/min, preferably at most 35 dg/min, preferably at most 30 dg/min, most preferably at most 25 dg/min, for example at most 20 dg/min (ISO 1133, 230° C., 2.16 kg) and for example at least 15 dg/min. This is advantageous for low emission of the final heterophasic propylene composition since the amount of low molecular weight oligomers increases with increasing the melt flow rate of the propylene-based matrix. Preferably, the propylene-based matrix of the intermediate propylene copolymer has a melt flow rate of at least 2 dg/min, at least 3 dg/min, at least 4 dg/min, at least 5 dg/min or for example at least 10 dg/min, for example at least 15 dg/min(ISO 1133, 230° C., 2.16 kg).

Preferably, the dispersed ethylene α-olefin copolymer of the intermediate propylene copolymer has a melt flow rate of at least 0.001 dg/min, at least 0.01 dg/min, at least 0.1 dg/min, at least 0.3 dg/min, at least 0.7 dg/min, at least 1 dg/min, and/or for example at most 10 dg/min, at most 5 dg/min or at most 3 dg/min, measured according to ISO1133 (2.16 kg/230° C.).

Preferably, the intermediate heterophasic propylene copolymer has a melt flow rate (intermediate melt flow rate) of at most 30 dg/min, more preferably at most 20 dg/min, more preferably at most 15 dg/min (ISO 1133, 230° C., 2.16 kg). Preferably, the melt flow rate of the intermediate heterophasic propylene copolymer is at least 2 dg/min, preferably at least 3 dg/min, preferably at least 4 dg/min, preferably at least 5 dg/min, or preferably at least 7 dg/min, for example at least 9 dg/min or at least 10 dg/min (ISO 1133, 230° C., 2.16 kg).

In a preferred embodiment, the propylene-based matrix of the intermediate propylene copolymer has a melt flow rate in the range from 10 to 30 dg/min, and the intermediate heterophasic propylene copolymer has a melt flow rate in the range from 7 to 15 dg/min.

Preferably, the intermediate heterophasic propylene copolymer has a FOG value as measured in accordance with VDA 278 of at most 250 μg/g, preferably at most 200 μg/g and more preferably at most 150 μg/g. The skilled person will understand that the term μg/g means micrograms of low molecular weight components per gram of polypropylene.

Catalyst System

In the process of the invention, step I) is performed in the presence of a catalyst system comprising a Ziegler-Natta catalyst and at least one external electron donor chosen from the group of a compound having a structure according to Formula III $(R^{90})_2N-Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, preferably ethyl, methyl or n-propyl, more preferably wherein the at least one external electron donor is chosen from the group consisting of diethylamino-triethoxysilane (DEATES), n-propyl triethoxysilane, (nPTES), n-propyl trimethoxysilane (nPTMS) and mixtures thereof.

Preferably, the catalyst system used in step I) is obtained by a catalyst preparation process comprising the steps of:
providing a magnesium-based support;

optionally activating said magnesium-based support using an activator;

contacting said magnesium-based support with a Ziegler-Natta type catalytic species, and optionally one or more internal electron donors to yield a procatalyst, and contacting said procatalyst with a co-catalyst and at least one external electron donor;

wherein the at least one external electron donor is chosen from the group consisting of a compound having a structure according to Formula III $(R^{90})_2N\text{—}Si(OR^{91})_3$, a compound having a structure according to Formula IV: $(R^{92})Si(OR^{93})_3$ and mixtures thereof, wherein each of $R^{90}$, $R^{91}$, $R^{92}$ and $R^{93}$ groups are each independently a linear, branched or cyclic, substituted or unsubstituted alkyl having between 1 and 10 carbon atoms, preferably a linear unsubstituted alkyl having between 1 and 8 carbon atoms, preferably ethyl, methyl or n-propyl.

In one embodiment, $R^{90}$ and $R^{91}$ are each ethyl (compound of Formula III is diethylaminotriethoxysilane, DEATES). In another embodiment, $R^{92}$ is n-propyl and $R^{93}$ are each ethyl (compound of Formula IV is n-propyl triethoxysilane, nPTES) or in another embodiment $R^{92}$ is n-propyl and $R^{93}$ are each methyl (compound of Formula IV is n-propyl trimethoxysilane, nPTMS), Preferably, the heterophasic propylene copolymer of the invention is prepared according to the process for the manufacture of the heterophasic propylene copolymer, wherein step I) is performed in the presence of a catalyst system comprising a Ziegler-Natta catalyst and at least one electron donor chosen from the group of nPTES, nPTMS, DEATES and mixtures thereof.

Preferably, the heterophasic propylene copolymer of the invention is prepared by a catalyst system comprising a Ziegler-Natta catalyst and at least one external electron donor chosen from the group of a compound having a structure according to Formula III $(R^{90})_2N\text{—}Si(OR^{91})_3$, a compound having a structure according to Formula IV: $(R^{92})Si(OR^{93})_3$ and mixtures thereof.

PCT patent application with application number PCT/EP2014/078796 describes a process for the preparation of a catalyst system suitable for olefin polymerization, said process comprising the steps of:

providing a magnesium-based support;

optionally activating said magnesium-based support;

contacting said magnesium-based support with a Ziegler-Natta type catalytic species, and optionally one or more internal electron donors to yield a procatalyst, and contacting said procatalyst with a co-catalyst and at least one external donor;

wherein the at least one external electron donor is n-propyltriethoxysilane. PCT/EP2014/078796 is hereby incorporated by reference.

PCT patent application with application number PCT/EP2014/078795 describes a process for the preparation of a catalyst system suitable for olefin polymerization, wherein the process comprises the steps of:

A) providing said procatalyst obtainable via a process comprising the steps of:

i) contacting a compound $R^4_z MgX^4_{2-z}$ with an alkoxy- or aryloxy-containing silane compound to give a first intermediate reaction product, being a solid $Mg(OR^1)_x X_{12-x}$, wherein: $R^4$ is the same as $R^1$ being a linear, branched or cyclic hydrocarbyl group independently selected from alkyl, alkenyl, aryl, aralkyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group consisting of fluoride (F—), chloride (Cl—), bromide (Br—) or iodide (I—), preferably chloride; z is in a range of larger than 0 and smaller than 2, being $0<z<2$;

ii) optionally contacting the solid $Mg(OR^1)_x X_{2-x}$ obtained in step i) with at least one activating compound selected from the group formed of activating electron donors and metal alkoxide compounds of formula $M^1(OR_2)_{v-w}(OR^3)_w$ Or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor being according to Formula III $(R^{90})_2N\text{—}Si(OR^{91})_3$ wherein each $R^{90}$ and $R^{91}$ are ethyl, being diethylaminotriethoxysilane (DEATES).

In an embodiment, the catalyst system used in step I) is obtained by the process according to PCT/EP2014/078795, which is hereby incorporated by reference.

Accordingly, in an embodiment, the process comprises the steps of i) preparing a magnesium-based support by heating a carbonated magnesium compound of the formula MgR'R"xCO$_2$ wherein R' is an alkoxide or aryloxide group, R" is an alkoxide group, aryloxide group or halogen, and x has a value between about 0.1 and 2.0 to a temperature above 100° C. for a period of time sufficient to cause complete loss of CO$_2$;

ii) contacting the resulting product with a halide of tetravalent titanium as the Ziegler-Natta type catalytic species in the presence of a halohydrocarbon and an internal electron donor; and iii) contacting the resulting halogenated product with a tetravalent titanium halide; and contacting the product thus obtained with the at least one external donor.

In another embodiment, the catalyst system used in step I) is obtained by a process comprising the step of preparing a magnesium-based support by halogenating a magnesium compound of the formula MgR'R", wherein R' and R" are alkoxide groups containing from 1 to 8 carbon atoms, with titanium tetrachloride, in the presence of (1) an aromatic halohydrocarbon containing from 6 to 12 carbon atoms and from 1 to 2 halogen atoms and (2) a polycarboxylic acid ester derived from a branched or unbranched monohydric alcohol containing from 1 to 12 carbon atoms, and a monocyclic or polycyclic aromatic compound containing from 8 to 20 carbon atoms and two carboxyl groups which are attached to ortho carbon atoms of the ring structure and contacting the product thus obtained with the external donor.

In another embodiment, the catalyst system used in step I) is obtained by a process comprising the steps of preparing the magnesium-based support by forming a solution of a magnesium-containing species from a magnesium carbonate or a magnesium carboxylate, precipitating solid particles from such magnesium-containing solution by treatment with a transition metal halide and an organosilane having a formula: Rn SiR'$_{4}$"n, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen, and reprecipitating such solid particles from a mixture containing a cyclic ether and contacting the product thus obtained with the external donor.

In another embodiment, the catalyst system used in step I) is obtained by a process comprising the steps of:
A) providing a procatalyst obtainable via a process comprising the steps of:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;
  ii) optionally contacting the solid $Mg(OR^1)_x X_{2-x}$ obtained in step i) with at least one activating compound selected from the group formed of activating electron donors and metal alkoxide compounds of formula $M^1(OR^2)_{v-w} (OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;
  iii) contacting the first or second intermediate reaction product, obtained respectively in step i) or ii), with a halogen-containing Ti-compound and optionally an internal electron donor to obtain said procatalyst;
B) contacting said procatalyst with a co-catalyst and the at least one external electron donor.

"Ziegler-Natta catalyst" as used in the present description means: a transition metal-containing solid catalyst compound comprises a transition metal halide selected from titanium halide, chromium halide, hafnium halide, zirconium halide, and vanadium halide, supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N).

"external donor" or "external electron donor" or "ED" as used in the present description means: an electron-donating compound used as a reactant in the polymerization of olefins. An ED is a compound added independent of the procatalyst. It contains at least one functional group that is capable of donating at least one pair of electrons to a metal atom.

"activator" as used in the present description means: an electron-donating compound containing one or more atoms of oxygen (O) and/or nitrogen (N) which is used during the synthesis of the procatalyst prior to the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13—or transition metal modifier is meant.

"procatalyst" and "catalyst component" as used in the present description have the same meaning: a component of a catalyst composition generally comprising a solid support, a transition metal-containing catalytic species and optionally one or more internal donor.

"hydrocarbyl" as used in the present description means: is a substituent containing hydrogen and carbon atoms; it is a linear, branched or cyclic, saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"Grignard reagent" or "Grignard compound" as used in the present description means: a compound or a mixture of compounds of formula $R^4_z MgX^4_{2-z}$ ($R^4$, z, and $X^4$ are as defined below) or it may be a complex having more Mg clusters, e.g. $R_4Mg_3Cl_2$.

Mixtures of external donors may be present and may include from about 0.1 mol. % to about 99.9 mol. % of the at least one external donor and from about 99.9 mol. % to about 0.1 mol. % of an additional external donor. In an embodiment, the at least one external electron donor is the only external donor used.

The aluminum/external donor molar ratio in the polymerization catalyst system preferably is between 0.1 and 200; more preferably between 1 and 100. In a Ti-based catalyst, the Si/Ti molar ratio in the catalyst system can range from 0.1 to 40, preferably from 0.1 to 20, even more preferably from 1 to 20 and most preferably from 2 to 10.

Typical external donors known in the art (for instance as disclosed in documents WO2006/056338A1, EP1838741B1, U.S. Pat. No. 6,395,670B1, EP398698A1, WO96/32426A) are organosilicon compounds having general formula $Si(OR^a)_{4-n}R^b_n$, wherein n can be from 0 up to 2, and each $R^a$ and $R^b$, independently, represents an alkyl or aryl group, optionally containing one or more hetero atoms for instance O, N, S or P, with, for instance, 1-20 carbon atoms; such as diisobutyl dimethoxysilane (DiBDMS), t-butyl isopropyl dimethyxysilane (tBiPDMS), cyclohexyl methyldimethoxysilane (CHMDMS), dicyclopentyl dimethoxysilane (DCPDMS) or di(iso-propyl) dimethoxysilane (DiPDMS).

Specific examples of several types of Ziegler-Natta catalyst are disclosed below.

Preferably, the present invention involves the use of a so-called TiNo catalyst. It is a magnesium-based supported titanium halide catalyst optionally comprising one or more internal donors.

EP 1 273 595 of Borealis Technology discloses a process for producing an olefin polymerization procatalyst in the form of particles having a predetermined size range, said process comprising: preparing a solution a complex of a Group IIa metal and an electron donor by reacting a compound of said metal with said electron donor or a precursor thereof in an organic liquid reaction medium; reacting said complex, in solution, with at least one compound of a transition metal to produce an emulsion the dispersed phase of which contains more than 50 mol. % of the Group IIa metal in said complex; maintaining the particles of said dispersed phase within the average size range 10 to 200 μm by agitation in the presence of an emulsion stabilizer and solidifying said particles; and recovering, washing and drying said particles to obtain said procatalyst. EP 1275595 and in particular the above described production method, is hereby incorporated by reference.

EP 0 019 330 of Dow discloses a Ziegler-Natta type catalyst composition. Said olefin polymerization catalyst composition is prepared using a process comprising: a) a reaction product of an organo aluminum compound and an electron donor, and b) a solid component which has been obtained by halogenating a magnesium compound with the formula $MgR^1R^2$ wherein $R^1$ is an alkyl, aryl, alkoxide or aryloxide group and $R^2$ is an alkyl, aryl, alkoxide or aryloxide group or halogen, are contacted with a halide of tetravalent titanium in the presence of a halohydrocarbon, and contacting the halogenated product with a tetravalent titanium compound. This production method as disclosed in EP 0 019 330 is incorporated by reference.

The Examples of U.S. Pat. No. 5,093,415 of Dow discloses an improved process to prepare a procatalyst. Said process includes a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst. The Examples of U.S. Pat. No. 5,093,415 are incorporated by reference.

In a preferred embodiment of the process of the invention, the catalyst preparation process comprises the steps of reacting titanium tetrachloride, diisobutyl phthalate, and magnesium diethoxide, and then titanium tetrachloride and phthaloyl chloride and again titanium tetrachloride.

Example 2 of U.S. Pat. No. 6,825,146 of Dow discloses another improved process to prepare a catalyst. Said process includes a reaction between titanium tetrachloride in solution with a precursor composition—prepared by reacting magnesium diethoxide, titanium tetraethoxide, and titanium tetrachloride, in a mixture of ortho-cresol, ethanol and chlorobenzene—and ethylbenzoate as electron donor. The mixture was heated and a solid was recovered. To the solid titanium tetrachloride, a solvent and benzoylchloride were added. The mixture was heated to obtain a solid product. The last step was repeated. The resulting solid procatalyst was worked up to provide a catalyst. Example 2 of U.S. Pat. No. 6,825,146 is incorporated by reference.

U.S. Pat. No. 4,771,024 discloses the preparation of a catalyst on column 10, line 61 to column 11, line 9. The section "catalyst manufacture on silica" is incorporated into the present application by reference. The process comprises combining dried silica with carbonated magnesium solution (magnesium diethoxide in ethanol was bubbled with $CO_2$). The solvent was evaporated at 85° C. The resulting solid was washed and a 50:50 mixture of titanium tetrachloride and chlorobenzene was added to the solvent together with ethylbenzoate. The mixture was heated to 100° C. and liquid filtered. Again $TiCl_4$ and chlorobenzene were added, followed by heating and filtration. A final addition of $TiCl_4$ and chlorobenzene and benzoylchloride was carried out, followed by heating and filtration. After washing the catalyst was obtained.

WO03/068828 discloses a process for preparing a catalyst component on page 91 "preparation of solid catalyst components" which section is incorporated into the present application by reference. Magnesium chloride, toluene, epoxy chloropropane and tributyl phosphate were added under nitrogen to a reactor, followed by heating. Then phthalic anhydride was added. The solution was cooled to −25° C. and $TiCl_4$ was added drop wise, followed by heating. An internal donor was added (1,3-diphenyl-1,3-propylene glycol dibenzoate, 2-methyl-1,3-diphenyl-1,3-propylene glycol dibenzoate, 1,3-diphenyl-1,3-propyleneglycol diproprionate, or 1,3-diphenyl-2-methyl-1,3-propylene glycol diproprionate) and after stirring a solid was obtained and washed. The solid was treated with $TiCl_4$ in toluene twice, followed by washing to obtain a catalyst component.

U.S. Pat. No. 4,866,022 discloses a catalyst component comprises a product formed by: A. forming a solution of a magnesium-containing species from a magnesium carbonate or a magnesium carboxylate; B. precipitating solid particles from such magnesium-containing solution by treatment with a transition metal halide and an organosilane having a formula: RnSiR'4-n, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen: C. reprecipitating such solid particles from a mixture containing a cyclic ether; and D. treating the reprecipitated particles with a transition metal compound and an electron donor. This process for preparing a catalyst is incorporated into the present application by reference.

In a preferred embodiment, the catalyst preparation process comprises the steps of reacting a magnesium-containing species, a transition metal halide and an organosilane, again with transition metal compound and an electron donor.

The procatalyst used in the catalyst system used according to the present invention may be produced by any method known in the art.

The procatalyst may also be produced as disclosed in WO96/32426A; this document discloses a process for the polymerization of propylene using a catalyst comprising a catalyst component obtained by a process wherein a compound with formula $Mg(OAlk)_xCl_y$ wherein x is larger than 0 and smaller than 2, y equals 2-x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor, which is di-n-butyl phthalate (DBP). The preparation of the procatalyst as described in WO96/42326A is hereby incorporated by reference.

Preferably, the Ziegler-Natta type procatalyst in the catalyst system used in the present invention is obtained by the process as described in WO 2007/134851 A1. In Example I the process is disclosed in more detail. Example I including all sub-examples (IA-IE) of WO 2007/134851 A1 is incorporated into the present description. More details about the different embodiments are disclosed starting on page 3, line 29 to page 14 line 29 of WO 2007/134851 A1. These embodiments are incorporated by reference into the present description. This process produces the TiNo procatalyst discussed above.

The process for preparing such a procatalyst comprises the following phases:
phase A): preparing a solid support for the procatalyst;
phase B): optionally activating said solid support obtained in phase A) using one or more activating compounds to obtain an activated solid support;
phase C): contacting said solid support obtained in phase A) or said activated solid support in phase B) with a catalytic species and optionally one or more internal donors and/or optionally an activator to obtain said procatalyst;
optionally Phase D: modifying said intermediate product obtained in phase C) with a Group 13—or transition metal modifier and optionally one or more internal donors.

Phase A relates to preparing a magnesium-based (also herein referred to as magnesium-containing) solid support for the catalyst. Said magnesium-containing support is known in the art as a typical component of a Ziegler-Natta procatalyst. This step of preparing a solid support for the catalyst is the same as in the prior art process. The description in the following paragraphs explains the process of preparing magnesium-based support. Other supports may be used. Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283 222A1, EP1222 214B1; U.S. Pat. Nos. 5,077,357; 5,556, 820; 4,414,132; 5,106,806 and 5,077,357 but the present process is not limited to the disclosure in these documents.

Preferably, the process for preparing the solid support for the procatalyst according to the present invention comprises the following steps: step o) preparing a Grignard reagent (optional) and step i) reacting a Grignard reagent with a silane compound.

A Grignard reagent may be prepared by contacting metallic magnesium with an organic halide as described in WO 96/32427 A1 and WO01/23441 A1. A commercial available Grignard reagent may also be used. In step i): said Grignard reagent is contacted with an alkoxy- or aryloxy-containing silane compound to give a first intermediate reaction product. Said first intermediate reaction product is a solid magnesium-containing support. Examples of these reactants are disclosed for example in WO 96/32427 A1 and WO01/ 23441 A1.

Preferably, said Grignard reagent is a hydrocarbyl magnesium chloride, wherein said hydrocarbyl can be an alkyl, aryl, aralkyl, alkoxide, phenoxide, etc., or mixtures thereof. Suitable examples of the hydrocarbyl group are methyl, ethyl, n-propyl, i-propyl, n-butyl, i-butyl, t-butyl, hexyl, cyclohexyl, octyl, phenyl, tolyl, xylyl, mesityl, benzyl, phenyl, naphthyl, thienyl, indolyl. In a preferred embodiment of the invention, a phenyl or butyl Grignard reagent (PhMgCl or BuMgCl) is used.

Non-limiting examples of suitable silane compounds for use in step i) include tetramethoxysilane, tetraethoxysilane, methyltrimethoxysilane, methyltributoxysilane, phenyltriethoxy-silane, diethyldiphenoxysilane, n-propyltriethoxysilane, diisopropyldimethoxysilane, diisobutyldimethoxysilane, n-propyltrimethoxysilane, cyclohexylmethyldimethoxysilane, dicyclopentyldimethoxy-silane, isobutylisopropyldimethoxyl-silane, phenyl-trimethoxysilane, diphenyl-dimethoxysilane, trifluoropropylmethyl-dimethoxysilane, bis(perhydroisoquinolino)-dimethoxysilane, dicyclohexyldimethoxy-silane, dinorbornyl-dimethoxysilane, di(n-propyl)dimethoxysilane, di(iso-propyl)-dimethoxysilane, di(n-butyl)dimethoxysilane and/or di(iso-butyl) dimethoxysilane. Preferably, tetraethoxy-silane is used as the silane compound.

Preferably, in step i) the silane compound and the Grignard compound are introduced simultaneously to a mixing device to result in particles of the first intermediate reaction product having advantageous morphology. This is for example described in WO 01/23441 A1. Here, 'morphology' does not only refer to the shape of the particles of the solid Mg-compound and the catalyst made therefrom, but also to the particle size distribution (also characterized as span), its fines content, powder flowability, and the bulk density of the catalyst particles. Moreover, it is well known that a polyolefin powder produced in a polymerization process using a catalyst system based on such procatalyst has a similar morphology as the procatalyst (the so-called "replica effect"; see for instance S. van der Ven, Polypropylene and other Polyolefins, Elsevier 1990, p. 8-10). Accordingly, almost round polymer particles are obtained with a length/diameter ratio (l/D) smaller than 2 and with good powder flowability. The Si/Mg molar ratio during step i) may range from 0.2 to 20. Preferably, the Si/Mg molar ratio is from 0.4 to 1.0.

The present inventors have found that when using the compounds according to the present invention the morphology of the support is maintained. This in turn leads to polymers having the same morphology. Moreover, the particle size distribution was also good.

Phase B is optional in the present invention and relates to the optional step of activating said solid support and comprises step ii), being contacting the solid support with at least one activating compound selected from the group formed by activating electron donors and activating metal alkoxide compounds.

The advantage of the use of this activation step prior to contacting the solid support with the catalytic species (process phase C) is that a higher yield of polyolefins is obtained per gram of the procatalyst. Moreover, the ethylene sensitivity of the catalyst system in the copolymerisation of propylene and ethylene is also increased because of this activation step. This activation step is disclosed in detail in WO2007/134851, which is hereby incorporated by reference.

Examples of suitable activating electron donors are an alcohol, like ethanol or hexanol, or an ester compound, like ethyl acetate, ethylbenzoate or a phthalate ester, or an ether, like dibutylether, or pyridine. Examples of suitable metal alkoxide compounds for use in step ii) are tetraethoxy silane or tetraethoxy titanium. Preferably, a Ti-based compound, for example titanium tetraethoxide, is used together with an activating electron donor compound, for example ethanol.

Phase C relates to the contacting of the support with a catalytic species and optionally one or more internal donors and/or one or more activators. Phase C may comprise several stages. During each of these consecutive stages the solid support is contacted with said catalytic species. In other words, the addition or reaction of said catalytic species may be repeated one or more times. When in phase D which is optional, an internal donor is added, it is not essential that an internal donor is also added during phase C.

For example, during stage I of phase C said solid support (first intermediate) or the activated solid support (second intermediate) is first contacted with said catalytic species and optionally subsequently with one or more internal donors. When a second stage is present, during stage II the intermediate product obtained from stage I will be contacted with additional catalytic species which may the same or different than the catalytic species added during the first stage and optionally one or more internal donors. In case three stages are present, stage III is preferably a repetition of stage II or may comprise the contacting of the product obtained from phase II with both a catalytic species (which may be the same or different as above) and one or more internal donors. In other words, an internal donor may be added during each of these stages or during two or more of these stages. When an internal donor is added during more than one stage it may be the same or a different internal donor.

One or more internal donors may be used which be any compound known in the art to be used as internal electron donor. Suitable non-limiting examples of internal donors are ethyl benzoate, di-n-butyl phthalate or diisobutyl phthalate, 2-ethyl-2-butyl-1, 3-dimethoxypropane, 2-isopropyl-2-isopentyl-1,3-dimethoxypropane and 9,9-bis(methoxymethyl) fluorene, diethyl 2,3-di-isopropylsuccinate, diethyl 2,3-di-n-propylsuccinate, diethyl 2,3-di-isobutylsuccinate, diethyl 2,3-di-sec-butylsuccinate, dimethyl 2,3-di-isopropylsuccinate, dimethyl 2,3-di-n-propylsuccinate, dimethyl 2,3-di-isobutylsuccinate, dimethyl 2,3-di-sec-butylsuccinate, benzamides such as benzamide, methylbenzamide, and dimethylbenzamide; pentanediol dibenzoate.

An activator according to the present invention—if used—may be added either during stage I or stage II or stage III of phase C. An activator may also be added during more than one stage. Examples of suitable activators are benzamide, alkylbenzoates, and monoesters, such as benzamide, methylbenzamide, dimethylbenzamide, methylbenzoate, ethylbenzoate, ethyl acetate, and butyl acetate. Most preferably ethylbenzoate.

In a preferred embodiment of the present invention a procatalyst is prepared having ethylbenzoate as activator since the inventors have observed that this improves the activity of the catalyst and produces polymers having enhanced properties. The amount of ethylbenzoate was adjusted experimental to provide optimum activity.

Preferably, phase C comprises reacting the solid support with a transition metal halide (e.g. titanium, chromium, hafnium, zirconium, vanadium). Preferably said solid support was reactive with titanium halide and optionally an internal electron donor or activator to obtain a third intermediate product.

Phase D is optional in the present invention and may comprise modifying the third intermediate product with a metal-modifier and optionally on or more internal donors to obtain a procatalyst. The modification with Group 13- or transition metal, preferably aluminium, ensures the presence of Group 13- or transition metal in the procatalyst, in addition to magnesium (from the solid support) and titanium (from the titanation treatment). After the modification step another treatment with the catalytic species is carried out, that is very similar to phase C.

The procatalyst thus prepared can be used in polymerization of olefins using an external donor and a co-catalyst.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990). The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst, such as triisobutylaluminum, trihexylaluminum, di-isobutylaluminum hydride, dihexylaluminum hydride, isobutylaluminum dihydride, hexylaluminum dihydride, diisobutylhexylaluminum, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the cocatalyst is selected from triethylaluminum, triisobutylaluminum, trihexylaluminum, di-isobutylaluminum hydride and dihexylaluminum hydride. More preferably, trimethylaluminium, triethylaluminium, triisobutylaluminium, and/or trioctylaluminium. Most preferably, triethylaluminium (abbreviated as TEAL). The co-catalyst can also be a hydrocarbyl aluminum compound such as tetraethyl-dialuminoxane, methylaluminoxane, isobutylaluminoxane, tetraisobutyl-dialuminoxane, diethyl-aluminumethoxide, diisobutylaluminum chloride, methylaluminum dichloride, diethylaluminum chloride, ethylaluminum dichloride and dimethylaluminum chloride, preferably TEAL. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1. The aluminium/external donor molar ratio in the polymerization catalyst system preferably is from 0.1 to 200; more preferably from 1 to 100.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters), (N-alkyl)amidobenzoates, 1,3-diethers, 1,5-diethers, silyl esters, fluorenes, succinates and/or combinations thereof.

It is preferred to use so-called phthalate free internal donors because of increasingly stricter government regulations about the maximum phthalate content of polymers. This leads to an increased demand in phthalate free catalyst compositions. In the context of the present invention, "essentially phthalate-free" of "phthalate-free" means having a phthalate content of less than for example 150 ppm, alternatively less than for example 100 ppm, alternatively less than for example 50 ppm, alternatively for example less than 20 ppm based on the total weight of the catalyst.

Suitable non-limiting examples of benzoic acid esters include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), and benzoic anhydride. The benzoic acid ester is preferably selected from ethyl benzoate, benzoyl chloride, ethyl p-bromobenzoate, n-propyl benzoate and benzoic anhydride. The benzoic acid ester is more preferably ethyl benzoate.

Suitable non-limiting examples of phthalic acid esters include dimethyl phthalate, diethyl phthalate, di-n-propyl phthalate, diisopropyl phthalate, di-n-butyl phthalate, diisobutyl phthalate, di-t-butyl phthalate, diisoamyl phthalate, di-t-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. The phthalic acid ester is preferably di-n-butyl phthalate or diisobutyl phthalate.

Suitable examples of 1,3-diethers compounds include but are not limited to diethyl ether, dibutyl ether, diisoamyl ether, anisole and ethylphenyl ether, 2,3-dimethoxypropane, 2,3-dimethoxypropane, 2-ethyl-2-butyl-1,3-dimethoxypropane, 2-isopropyl-2-isopentyl-1,3-dimethoxypropane and 9,9-bis (methoxymethyl) fluorene.

Suitable examples of succinates, for example succinate acid esters include but are not limited to diethyl 2,3-diisopropylsuccinate, diethyl 2,3-di-n-propylsuccinate, diethyl 2,3-di-isobutylsuccinate, diethyl 2,3-di-sec-butylsuccinate, dimethyl 2,3-di-isopropylsuccinate, dimethyl 2,3-di-n-propylsuccinate, dimethyl-2,3-di-isobutylsuccinate and dimethyl 2,3-di-sec-butylsuccinate.

The silyl ester as internal donor can be any silyl ester or silyl diol ester known in the art, for instance as disclosed in US 2010/0130709.

The aminobenzoates may be represented by formula (XI):

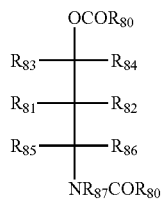

Formula XI wherein:
$R^{80}$, $R^{81}$, $R^{82}$, $R^{83}$, $R^{84}$, $R^{85}$, $R^{86}$ and $R^{87}$ are independently selected from a group consisting of hydrogen or $C_1$-$C_{10}$ hydrocarbyl.

For example, the internal electron donor is selected from the group consisting of 4-[benzoyl(methyl)amino]pentan-2-yl benzoate; 2,2,6,6-tetramethyl-5-(methylamino)heptan-3-ol dibenzoate; 4-[benzoyl (ethyl)amino]pentan-2-yl benzoate, 4-(methylamino)pentan-2-yl bis (4-methoxy)benzoate); 3-[benzoyl(cyclohexyl)amino]-1-phenylbutylbenzoate; 3-[benzoyl(propan-2-yl)amino]-1-phenylbutyl; 4-[benzoyl (methyl)amino]-1,1,1-trifluoropentan-2-yl; 3-(methyl-amino)-1,3-diphenylpropan-1-ol dibenzoate; 3-(methyl) amino-propan-1-ol dibenzoate; 3-(methyl)amino-2,2-dimethylpropan-1-ol dibenzoate, and 4-(methylamino) pentan-2-yl-bis (4-methoxy)benzoate).

The molar ratio of the internal donor relative to the magnesium can be from 0.02 to 0.5. Preferably, this molar ratio is between 0.05 and 0.2.

Examples of benzamides include benzamides according to formula X,

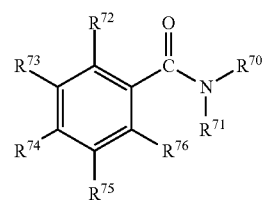

Formula X wherein: $R^{70}$ and $R^{71}$ are each independently selected from hydrogen or an alkyl, preferably an alkyl, more preferably having between 1 and 6 carbon atoms; $R^{72}$, $R^{73}$, $R^{74}$, $R^{75}$, $R^{76}$ are each independently selected from hydrogen, a heteroatom such as a halide, or a hydrocarbyl group selected e.g. from alkyl, alkenyl, aryl, aralkyl, alkoxycarbonyl or alkylaryl groups, and one or more combinations thereof, wherein preferably the activator is N,N-dimethylbenzamide, wherein preferably the benzamide according to formula X is present in the procatalyst in an amount from 0.1 to 4 wt. % as determined using HPLC, for example from 0.1 to 3.5 wt. %, for example from 0.1 to 3 wt. %, for example from 0.1 to 2.5 wt. %, for example from 0.1 to 2.0 wt. %, for example from 0.1 to 1.5 wt. %.

As discussed in WO 2013/124063, hereby incorporated by reference, 1,5-diesters, for example pentanediol dibenzoate, preferably meso pentane-2,4-diol dibenzoate (mPDDB), can be used as internal donors.

Preferably, the catalyst system is obtained by
a catalyst preparation process comprising the steps of:
A) providing a procatalyst obtainable via a process comprising the steps of:
i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has between 1 and 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being 0<z<2;
ii) optionally contacting the solid $Mg(OR')_x X_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has between 1 and 20 carbon atoms;

iii) contacting the first or second intermediate reaction product, obtained respectively in step i) or ii), with a halogen-containing Ti-compound and optionally an internal electron donor to obtain said procatalyst;

B) contacting said procatalyst with a co-catalyst and the at least one external electron donor;

a catalyst preparation process comprising the steps of reacting titanium tetrachloride, diisobutyl phthalate, and magnesium diethoxide, and then titanium tetrachloride and phthaloyl chloride and again titanium tetrachloride or a catalyst preparation process comprising the steps of reacting a magnesium-containing species, a transition metal halide and an organosilane, again with transition metal compound and an electron donor.

Step II)

The term "visbreaking" is well known in the field of the invention. For example methods of visbreaking polypropylene have been disclosed in U.S. Pat. No. 4,282,076 and EP 0063654.

Several different types of chemical reactions which are well known can be employed for visbreaking propylene polymers. An example is thermal pyrolysis, which is accomplished by exposing a polymer to high temperatures, e.g., in an extruder at 350° C. or higher. Another approach is exposure to powerful oxidizing agents. A further approach is exposure to ionizing radiation. It is preferred however that visbreaking is carried out using a peroxide. Such materials, at elevated temperatures, initiate a free radical chain reaction resulting in beta-scission of the polypropylene molecules. The visbreaking may be carried out directly after polymerisation and removal of unreacted monomer and before pelletisation (during extrusion in an extruder wherein shifting of the intermediate heterophasic propylene copolymer occurs). However, the invention is not limited to such an embodiment and visbreaking may also be carried out on already pelletised polypropylene, which polypropylene generally contains stabilisers to prevent degradation.

Examples of suitable peroxides include organic peroxides having a decomposition half-life of less than 1 minute at the average process temperature during step II). Suitable organic peroxides include but are not limited to dialkyl peroxides, e.g. dicumyl peroxides, peroxyketals, peroxycarbonates, diacyl peroxides, peroxyesters and peroxydicarbonates. Specific examples of these include benzoyl peroxide, dichlorobenzoyi peroxide, dicumyl peroxide, di-tert-butyl peroxide, 2,5-dimethyl-2,5-di(peroxybenzoato)-3-hexene, 1,4-bis(tert-butylperoxyisopropyl)benzene, lauroyl peroxide, tert-butyl peracetate, a,a'-bis(tert-butylperoxy)diisopropylbenzene (Luperco® 802), 2,5-dimethyl-2,5-di(tert-butylperoxy)-3-hexene, 2,5-dimethyl-2,5-di(tert-butylperoxy)-hexane, tert-butyl perbenzoate, tert-butyl perphenylacetate, tert-butyl per-sec-octoate, tert-butyl perpivalate, cumyl perpivalate, cumene hydroperoxide, diisopropyl benzene hydroperoxide, 1,3-bis(t-butylperoxy-isopropyl)benzene, dicumyl peroxide, tert-butylperoxy isopropyl carbonate and any combination thereof. Preferably, a dialkyl peroxides is employed in the process according to the present invention. More preferably, the peroxide is a,a'-bis-(tert-butylperoxy) diisopropylbenzene, 2,5-dimethyl-2,5-di(tert-butylperoxy)-hexane or 3,6,9-Triethyl-3,6,9-trimethyl-1,4,7-triperoxonane. Preferably, the peroxide is selected from the group of non-aromatic peroxides.

It can easily be determined by the person skilled in the art through routine experimentation how much peroxide should be used to obtain a composition having the desired melt flow rate. This also depends on the half-life of the peroxide and on the conditions used for the melt-mixing, which in turn depend on the exact composition.

Typically, the amount of peroxide used will lie in the range of 0.02 to 0.5 wt %, for example 0.08 to 0.2 wt %, for example 0.1 to 0.2 wt %, based on the intermediate heterophasic propylene copolymer produced in step I).

The heterophasic propylene copolymer obtained after step II) has the target melt flow rate. Preferably, the target melt flow rate of the heterophasic propylene copolymer is at least 40 dg/min, for example at least 50 dg/min or at least 60 dg/min, and/or at most 90 dg/min, for example at most 80 dg/min or at most 70 dg/min (ISO 1133, 230° C., 2.16 kg). Preferably, the target melt flow rate of the heterophasic propylene copolymer is 50-80 dg/min (ISO 1133, 230° C., 2.16 kg). The target melt flow rate of at most 80 dg/min or at most 70 dg/min is advantageous for even more reduced FOG values.

In order to achieve good mechanical properties of the heterophasic propylene copolymer as compared to a heterophasic propylene copolymer having the target melt flow rate which has not been manufactured involving a step of visbreaking, the ratio of target to intermediate melt flow rate is at least 2, preferably from 2 to 20, more preferably from 2 to 10, even more preferably from 4 to 10.

Preferably, the heterophasic propylene copolymer having the target melt flow rate has a FOG value as measured in accordance with VDA 278 of at most 300 µg/g, preferably at most 250 µg/g, more preferably at most 200 µg/g and even more preferably at most 150 µg/g. The skilled person will understand that the term µg/g means micrograms of low molecular weight components per gram of polypropylene.

Optional Step III)

The heterophasic propylene copolymer according to the invention has a relatively low FOG value of at most 350 µg/g after step II) without any further treatment for lowering the FOG value. Such step is also known as a venting, purging or degassing step and as such is known to the person skilled in the art In some embodiments, it is possible to further reduce the FOG value of the heterophasic propylene copolymer according to the invention by performing the step III) of maintaining the polypropylene obtained from step II) at an elevated temperature for a time sufficient to reduce the FOG value of the heterophasic propylene copolymer as determined in accordance with VDA 278. However, it will be appreciated that the present invention is also directed to a process without such step III).

Depending on the conditions at which the heterophasic propylene copolymer is maintained in step III), practical lower limits of the FOG values of the heterophasic propylene copolymer obtained after step III) include at least 25 µg/g, at least 50 µg/g or at least 100 µg/g.

The heterophasic propylene copolymer obtained after step II) and/or III) may be combined with one or more reinforcing fillers and/or impact modifiers and/or further additives. Examples of such reinforcing fillers include organic fibers, such as aramid, carbon or polyester fibers; inorganic fibers such as glass fibres; inorganic reinforcing fillers such as talc or clay nanoparticles.

For example, the heterophasic propylene copolymer obtained after step II) and optional step III) may be compounded with a reinforcing filler, such as talc, and thereafter maintained at an elevated temperature so as to reduce the FOG value (step III)).

Similarly the reinforcing filler may be added after the heterophasic propylene copolymer from step II) has been maintained at elevated temperature in step III). The present invention is not limited in this respect and further allows the combining of reinforcing fillers with the heterophasic propylene copolymer after both step II) as step III).

Preferably, the heterophasic propylene copolymer is combined with less than 5 wt % of inorganic reinforcing fillers, more preferably, less than 4 wt %, even more preferably less than 3 wt %, even more preferably less than 2 wt %, even more preferably less than 1 wt %, even more preferably less than 0.5 wt %, even more preferably less than 0.3 wt %, even more preferably less than 0.1 wt %, most preferably less than 0.01 wt % inorganic reinforcing filler.

The heterophasic propylene copolymer obtainable by the process of the invention may be compounded with such further materials, e.g. reinforcing fillers, using methods known in the art.

Alternatively the heterophasic propylene copolymer obtained after step II) or step III) may be combined with one or more of a glass multifibre filament strand, or roving. Such may be accomplished by pulling such multifilament strand through a bath of molten thermoplastic material comprising or consisting of said heterophasic propylene copolymer. Alternatively the thermoplastic material comprising or consisting of said heterophasic propylene copolymer is applied as a sheath over said multifibre strand. Such a method is known for example from WO 2009/080821. The so sheathed or pulltruded continuous (glass) multifilament strands may be cut into pellets of desired length such as from 2-50 mm, 5-20 mm or 10-15 mm.

Here again the step of pultrusion or sheathing may be carried out after step II) and before step III) or after step III).

The present invention further relates to the heterophasic propylene copolymer obtainable or obtained by the process of the invention.

The present invention further relates to an automotive interior article comprising the heterophasic propylene copolymer of the invention. Such applications may include instrument panel carriers, door panels, dashboards, dashboard carriers, door claddings, door fixtures, armrests, pillar cladding, seat cladding, boot cladding, interior trims and applications in heating, ventilation, air conditioning (HVAC) applications.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Measurements

Melt flow rate was determined in accordance with ISO 1133 at 230° C. and 2.16 kg.

FOG values were determined in accordance with VDA 278. Immediately after peroxide shifting (step II), samples were taken and sealed in Lamigrip aluminium bags from Fisher Scientific. The FOG values were measured within a week from sealing the bags.

FOG was determined according to VDA 278:2011 from pellets. FOG according to VDA 278 is the sum of all organic compounds of low volatility, which have an elution time greater than or equal to n-tetradecane. FOG is calculated as tetradecane equivalent (TE). FOG according to VDA 278 represents organic compounds in the boiling point range of n-alkanes $C_{14}$ to $C_{32}$. VDA standards are issued by "Verband der Automobilindustrie". The VDA standards used herein are available from Dokumentation Kraftfahrwesen (DKF); Ulrichstrasse 14, D-74321 Bietigheim-issingen, Germany or can be downloaded from their website (www.dkf-ev.de).

EXPERIMENTAL

Procatalyst I

Catalyst I is prepared according to the method disclosed in U.S. Pat. No. 4,866,022, hereby incorporated by reference. This patent discloses a catalyst component comprising a product obtained by: (a) forming a solution of a magnesium-containing species from a magnesium carbonate or a magnesium carboxylate; (b) precipitating solid particles from such magnesium-containing solution by treatment with a transition metal halide and an organosilane having a formula: $R_nSiR'_{4-n}$, wherein n=0 to 4 and wherein R is hydrogen or an alkyl, a haloalkyl or aryl radical containing one to about ten carbon atoms or a halosilyl radical or haloalkylsilyl radical containing one to about eight carbon atoms, and R' is OR or a halogen; (c) reprecipitating such solid particles from a mixture containing a cyclic ether; and (d) treating the reprecipitated particles with a transition metal compound and an electron donor. This process for preparing a catalyst is incorporated into the present application by reference.

Procatalyst II

A. Grignard Formation Step

A stirred flask, fitted with a reflux condenser and a funnel, was filled with magnesium powder (24.3 g). The flask was brought under nitrogen. The magnesium was heated at 80° C. for 1 hour, after which dibutyl ether (DBE, 150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colorless solution above the precipitate, a solution of butylmagnesiumchloride (reaction product of step A) with a concentration of 1.0 mol Mg/l was obtained.

B. Preparation of the Intermediate Reaction Product 250 mL of dibutyl ether was introduced to a 1 L reactor fitted with a propeller stirrer and two baffles. The reactor was thermostated at 35° C. and the stirrer speed was kept at 200 rpm. Then a cooled (to 15° C.) 360 mL solution of the Grignard reaction product as prepared in A and 180 ml of a cooled (to 15° C.) solution of 38 ml of tetraethoxysilane (TES) in 142 ml of DBE were dosed into the reactor for 400 min. with preliminary mixing in a minimixer of 0.15 ml volume, which was cooled to 15° C. by means of cold water circulating in the minimixer jacket. The premixing time was 18 seconds in the minimixer and the connecting tube between the minimixer and the reactor. The stirring speed in the minimixer was 1000 rpm. On the dosing completion, the reaction mixture was kept at 35° C. for 0.5 hours. Then the reactor was heated to 60° C. and kept at this temperature for 1 hour. Then the stirring was stopped and the solid substance was allowed to settle. The supernatant was removed by decanting. The solid substance was washed three times using 300 ml of heptane. As a result, a white solid reaction product was obtained and suspended in 200 ml of heptane.

Under an inert nitrogen atmosphere at 20° C. a 250 ml glass flask equipped with a mechanical agitator is filled with a slurry of 5 g of the reaction product of step B dispersed in 60 ml of heptane. Subsequently, a solution of 0.86 ml methanol (MeOH/Mg=0.5 mol) in 20 ml heptane is dosed under stirring during 1 hour. After keeping the reaction mixture at 200° C. for 30 minutes the slurry was slowly allowed to warm up to 300° C. for 30 min and kept at that temperature for another 2 hours. Finally the supernatant liquid is decanted from the solid reaction product which was washed once with 90 ml of heptane at 300° C.

C. Preparation of the Catalyst

A reactor was brought under nitrogen and 125 ml of titanium tetrachloride was added to it. The reactor was heated to 90° C. and a suspension, containing about 5.5 g of the support obtained in step C in 15 ml of heptane, was added to it under stirring. The reaction mixture was kept at 90° C. for 10 min. Then ethyl benzoate was added (EB/Mg=0.15 molar ratio). The reaction mixture was kept for 60 min. Then the stirring was stopped and the solid substance was allowed to settle. The supernatant was removed by decanting, after which the solid product was washed with chlorobenzene (125 ml) at 90° C. for 20 min. The washing solution was removed by decanting, after which a mixture of titanium tetrachloride (62.5 ml) and chlorobenzene (62.5 ml) was added. The reaction mixture was kept at 90° C. for 30 min. After which the stirring was stopped and the solid substance was allowed to settle. The supernatant was removed by decanting, after which a mixture of titanium tetrachloride (62.5 ml) and chlorobenzene (62.5 ml) was added. Then di-n-butyl phthalate (DBP) (DBP/Mg=0.15 molar ratio) in 3 ml of chlorobenzene was added to reactor and the temperature of reaction mixture was increased to 115° C. The reaction mixture was kept at 115° C. for 30 min. After which the stirring was stopped and the solid substance was allowed to settle. The supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle. The supernatant was removed by decanting and the solid was washed five times using 150 ml of heptane at 600° C., after which the catalyst III, suspended in heptane, was obtained.

Procatalyst III

Catalyst III is prepared according to the method described in U.S. Pat. No. 5,093,415 of Dow, hereby incorporated by reference. This patent discloses an improved process to prepare a catalyst including a reaction between titanium tetrachloride, diisobutyl phthalate, and magnesium diethoxide to obtain a solid material. This solid material is then slurried with titanium tetrachloride in a solvent and phthaloyl chloride is added. The reaction mixture is heated to obtain a solid material which is reslurried in a solvent with titanium tetrachloride. Again this was heated and a solid collected. Once again the solid was reslurried once again in a solution of titanium tetrachloride to obtain a catalyst.

Propylene Homopolymer Polymerization Experiments (Reference)

Polymerization experiments of propylene homopolymers (Table 1) were performed on a bench-scale gas-phase reactor using procatalysts I, II and III described above with different external electron donors in order to determine the effect of the external electron donors on the FOG values of polypropylene. Triethylaluminium was used as co-catalyst, and two external electron donors were employed; di(iso-propyl) dimethoxysilane (DiPDMS) and n-propyltriethoxysilane (nPTES). Homopolymers produced using nPTES are denoted with RE as reference experiments. Homopolymers produced using DiPDMS are denoted with CE as comparative experiments. RE and CE are not experiments according to the invention, but together show the effects of the type of the external electron donors on the FOG values of polypropylene. Propylene homopolymers of melt flows 20 and 50 dg/min were produced at different H2/C3 molar ratios, due to the different hydrogen sensitivity of the external donors. H2/C3 is the molar ratio of hydrogen to propylene in the gas cap of the reactor, measured by on-line gas chromatography.

TABLE 1 polymerization and FOG data of PP homopolymers

| Exp # | Procatalyst | External Donor | $H_2/C_3$ mol/mol | MFR R1 dg/min | FOG µg/g |
|---|---|---|---|---|---|
| CE1 | I | DiPDMS | 0.061 | 20 | 378 |
| RE1 | I | nPTES | 0.0175 | 20 | 287 |
| CE2 | I | DiPDMS | 0.087 | 50 | 790 |
| RE2 | I | nPTES | 0.039 | 50 | 335 |
| CE3 | II | DiPDMS | 0.062 | 20 | 440 |
| RE3 | II | nPTES | 0.013 | 20 | 215 |
| CE4 | II | DiPDMS | 0.085 | 50 | 543 |
| RE4 | II | nPTES | 0.031 | 50 | 246 |
| CE5 | III | DiPDMS | 0.0376 | 20 | 301 |
| RE5 | III | nPTES | 0.0085 | 20 | 166 |
| CE6 | III | DiPDMS | 0.07 | 50 | 473 |
| RE6 | III | nPTES | 0.0244 | 50 | 218 |

* Materials polymerized at bench scale and then extruded on mini-extruder

From Table 1, it is clear that, whatever the procatalyst used, the use of nPTES as external electron donor always results in propylene homopolymers with lower FOG emissions compared to materials with similar MFR values and made using other external electron donors. This can be for example illustrated by comparing RE2 with CE2 and when comparing RE5 with CE5. This table also shows that FOG value of a propylene homopolymer with a certain procatalyst system increases with increasing melt flow rate.

Moreover, the combination of nPTES with procatalyst III leads to the lowest FOG values at given MFR. For instance, this can be observed when comparing RE6 with RE2 and RE4.

The findings from these results on propylene homopolymers can be applied for heterophasic propylene copolymers.

Heterophasic Propylene Copolymer Polymerization Experiments

Step I)

Four heterophasic propylene copolymers (B, C, E, F) were produced by co-polymerization of propylene and ethylene using two reactors in series. In the first reactor (temperature 60-85° C., pressure $2.2 \cdot 10^6$-$3.0 \cdot 10^6$ bar), the propylene homopolymer matrix phase was prepared. After polymerization, the powder was transported from the first to the second reactor (temperature 60-85° C., pressure $2.2 \cdot 10^6$-$3.0 \cdot 10^6$ bar) where the polymerization of the rubber phase consisting of an ethylene-propylene copolymer was done. Materials were prepared using the catalyst system composed of procatalyst III and nPTES that shows the most promising results in terms of FOG emissions for propylene homopolymers (Table 1). For two heterophasic copolymers (B and E), respective homopolymers (A and D) were also produced to compare emission levels. Table 2 provides an overview of reactor powders A-F that were prepared in this manner. MFR R1 represents the melt flow rate of the propylene homopolymer manufactured in the first reactor, whereas total MFR represents the melt flow rate of the intermediate heterophasic propylene copolymer powder, i.e. the propylene heterophasic copolymers. RC represents the amount of rubber phase based on the total weight of the heterophasic propylene copolymer. The ethylene weight percentage of the ethylene-propylene rubber phase (i.e. RCC2) was set at 53 wt % for all the heterophasic propylene copolymers.

TABLE 2

FOG data of PP homopolymers and respective heterophasic copolymers (RCC2 53 wt %)

| Exp # | Catalyst | Ext. Donor | $H_2/C_3$ R1 mol/mol | MFR R1 dg/min | Total MFR dg/min | RC wt. % | FOG pg/g |
|---|---|---|---|---|---|---|---|
| A | III | nPTES | 0.006 | 15 | — | — | 124 |
| B | III | nPTES | 0.006 | 15 | 5.5 | 28.2 | 130 |
| C | III | nPTES | 0.0104 | 24 | 9 | 27.8 | 127 |
| D | III | nPTES | 0.019 | 40 | — | — | 164 |
| E | III | nPTES | 0.019 | 40 | 17 | 26.6 | 172 |
| F | III | nPTES | 0.028 | 60 | 27.5 | 22.4 | 343 |
| G | III | nPTES | 0.0083 | 20 | 9.5 | 22.1 | 120 |
| H | III | nPTES | 0.0083 | 20 | 12 | 18.3 | 115 |
| I | III | nPTES | 0.108 | 25 | 10 | 22.2 | 161 |

From Table 2, it is clear that FOG emissions of propylene heterophasic copolymers are directly related to the molecular characteristics of the propylene homopolymer produced in the first reactor (i.e. MFR R1), whereas the contribution of the high molecular weight rubber phase to the sum of all organic compounds of low volatility is negligible. This can be observed when comparing Examples A and B together, or also Examples D and E. Similar FOG values are measured for the propylene homopolymer as its respective heterophasic copolymer.

Step II)

For achieving high flow propylene heterophasic copolymers, these reactor powders (the intermediate heterophasic propylene copolymer powders) were melt-processed by peroxide shifting (i.e. visbreaking) to higher melt flow rates to obtain the final heterophasic propylene copolymer. This was done by feeding the powder to an extruder and adding Luperco 802PP40 as a peroxide (1,4-bis(2-tert-butylperoxypropan-2-yl)benzene, CAS Registry Number: 2781-00-2) in different concentrations. Table 3 lists details of the visbreaking experiments for reactor powders C and F including starting MFR (intermediate MFR) and final MFR (target MFR), the amount of peroxide in weight percentage and FOG values. Besides the peroxide, some additives common in the art were also added (0.25 weight percentage). The additive package was the same for all experiments.

TABLE 3

FOG data of PP impact base powders (the intermediate heterophasic propylene copolymer) and the peroxide shifted products (the final heterophasic propylene copolymer)

| Exp # | Intermediate MFR dg/min | Target MFR dg/min | Target MFR / Intermediate MFR | Peroxide wt. % | RC wt. % | FOG µg/g |
|---|---|---|---|---|---|---|
| B | 5.5 | 5.5 | 1 | 0 | 28.2 | 130 |
| BS1 | 5.5 | 29 | 5.2 | 0.19 | 28.2 | 300 |
| BS2 | 5.5 | 41 | 7.4 | 0.23 | 28.2 | 375 |
| BS3 | 5.5 | 65 | 11.8 | 0.37 | 28.2 | 511 |
| C | 9 | 9 | 1 | 0 | 27.8 | 127 |
| CS1 | 9 | 27 | 3 | 0.08 | 27.8 | 228 |
| CS2 | 9 | 40 | 4.4 | 0.14 | 27.8 | 284 |
| CS3 | 9 | 59 | 6.6 | 0.2 | 27.8 | 325 |
| E | 17 | 17 | 1 | 0 | 26.5 | 172 |
| ES1 | 17 | 28 | 1.6 | 0.035 | 26.5 | 298 |
| ES2 | 17 | 61 | 3.6 | 0.085 | 26.5 | 458 |
| F | 27.5 | 27.5 | 1 | 0 | 22.4 | 343 |
| FS1 | 27.5 | 55 | 2 | 0.08 | 22.4 | 448 |
| G | 9.5 | 9.5 | 1 | 0 | 22.1 | 120 |
| GS1 | 9.5 | 62 | 6.5 | 0.24 | 22.1 | 322 |
| H | 12 | 12 | 1 | 0 | 18.3 | 115 |
| HS1 | 12 | 60 | 5 | 0.216 | 18.3 | 316 |
| I | 10 | 9.5 | 1 | 0 | 22.2 | 161 |
| IS1 | 10 | 41 | 4.1 | 0.13 | 22.2 | 333 |

\* BS1, BS2 and BS3 are peroxide shifted heterophasic copolymers from experiment B, CS1 and CS2 are peroxide shifted heterophasic copolymers from experiment C, ES1 and ES2 are peroxide shifted heterophasic copolymers from experiment E, FS1 is heterophasic copolymer peroxide shifted from experiment F, GS1 is peroxide shifted heterophasic copolymer from experiment G, HS1 is peroxide shifted heterophasic copolymer from experiment H and IS1 is peroxide shifted heterophasic copolymer from experiment I.
\* intermediate MFR is the MFR of the intermediate heterophasic propylene copolymer
\* target MFR is the MFR of the final heterophasic propylene copolymer To allow a direct comparison, all VDA278 measurements were carried out on the same GC equipment.

Table 3 shows that the visbreaking of a heterophasic propylene copolymer to higher melt flow rates commonly results in increased FOG values. The same table however also demonstrates that lower FOG values can be obtained when using the visbreaking process to reach a certain melt flow rate compared to virgin reactor powder with the same final MFR. For instance, Example CS1, which is peroxide shifted from MFR 9 to 27 dg/min, has a lower FOG value than Example F, a polymerized reactor powder with same MFR. Example CS3 which has been produced according to the invention by the preparation of a heterophasic propylene copolymer of a relatively low MFR (9 dg/min) and subsequent visbreaking has a high final MFR (59 dg/min) and a low FOG value (325 µg/g).

However, peroxide shifting a heterophasic propylene copolymer with a lower intermediate MFR to a high final MFR leads to higher FOG values due to the large concentration of peroxide required to reach the target MFR value as compared to peroxide shifting of a heterophasic propylene copolymer with a somewhat higher intermediate MFR to the same final MFR. For instance, Example BS3, which is peroxide shifted from MFR 5.5 to 65 dg/min, has a significantly higher FOG value than Example CS3, which is peroxide shifted from MFR 9 to 59 dg/min. The person skilled in the art knows how to vary the MFR value of the intermediate heterophasic propylene copolymer (for example by varying the MFR of the propylene homopolymer, by varying the MFR of the rubber phase or by varying the RC). As is shown above, the MFR value of the intermediate heterophasic propylene copolymer influences the FOG values for the desired MFR of the final heterophasic propylene copolymer.

As also shown by the examples above, the shifting ratio is preferably chosen such that it complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer.

Therefore, in a preferred embodiment, the invention relates to a heterophasic propylene copolymer of the invention, which heterophasic propylene copolymer has a melt flow rate of at least 40 g/10 min and preferably of at most 90 g/10 min, for example of at most 80 g/10 min, for example of at most 70 g/10 min and an FOG value of at most 350 µg/g as determined by VDA 278, obtained by visbreaking of an intermediate heterophasic propylene copolymer in a shifting ratio, which complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer, wherein the melt flow rate is determined in accordance with ISO1133 (230° C., 2.16 kg).

In a preferred embodiment, the invention relates to a heterophasic propylene copolymer of the invention, which heterophasic propylene copolymer has a melt flow rate of at least 40 g/10 min and of at most 90 g/10 min, for example of at most 80 g/10 min, for example of at most 70 g/10 min and an FOG value of at most 350 µg/g as determined by VDA 278, obtained by visbreaking of an intermediate heterophasic propylene copolymer in a shifting ratio, which complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer, wherein the melt flow rate is determined in accordance with ISO1133 (230° C., 2.16 kg) and wherein the intermediate heterophasic propylene copolymer has a propylene-based matrix with a melt flow rate of at most 70 dg/min as determined in accordance with ISO1133 (230° C., 2.16 kg).

In another aspect, the invention relates to a process for the preparation of a heterophasic propylene copolymer of the invention, which heterophasic propylene copolymer has a melt flow rate of at least 40 g/10 min and preferably of at most 90 g/10 min, for example of at most 80 g/10 min, for example of at most 70 g/10 min and an FOG value of at most 350 µg/g as determined by VDA 278 and for example comprising the step of visbreaking an intermediate heterophasic propylene copolymer in a shifting ratio, which complies with the following formula:

$$0.0011x^2 - 0.011x + 1 \leq \text{shifting ratio} \leq -0.0009x^2 + 0.1963x + 1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer, to obtain the heterophasic propylene copolymer wherein the melt flow rate is determined in accordance with ISO1133 (230° C., 2.16 kg).

Preferably, in such process, the intermediate heterophasic propylene copolymer has a propylene-based matrix with a melt flow rate of at most 70 dg/min as determined in accordance with ISO1133 (230° C., 2.16 kg).

Reference Experiments WO2014/044680A1

The experiments of WO2014/044680 A1 were repeated using the same coated talc as sample number 2 in this patent application, the FOG was also measured.

TABLE 4

FOG data of PP impact base powders (the intermediate heterophasic propylene copolymer) and the peroxide shifted products (the final heterophasic propylene copolymer) unfilled and filled with 2.5 wt % of talc (Ref to WO2014/044680A1).

| Exp # | Intermediate MFR dg/min | Target MFR dg/min | Target MFR / Intermediate MFR | Talc wt. % | Peroxide wt. % | FOG µg/g |
|---|---|---|---|---|---|---|
| CET1 | 1.5 | 1.5 | 1 | 0 | 0 | 256 |
| CET2 | 1.5 | 1.5 | 1 | 2.5 | 0 | 232 |
| CET3 | 1.5 | 15 | 10 | 0 | 0.16 | 509 |
| CET4 | 1.5 | 15 | 10 | 2.5 | 0.16 | 537 |
| CET5 | 1.5 | 40 | 26.7 | 0 | 0.3 | 655 |
| CET6 | 1.5 | 40 | 26.7 | 2.5 | 0.3 | 766 |
| CET7 | 1.5 | 60 | 40 | 0 | 0.5 | 804 |

As can be seen from Table 4 above, the FOG of the heterophasic propylene copolymer prepared in accordance with WO2014/044680A1 and shifted to a melt flow rate of at least 40 g/10 min have an FOG of well above 350 µg/g as determined by VDA 278.

The FOG values of the heterophasic propylene copolymer of the present invention having a melt flow rate of at least 40 g/10 min as determined in accordance with ISO 1133 (230° C., 2.16 kg) are below 350 µg/g as determined by VDA 278;

Compare for instance, CET5 in Table 4, which is a heterophasic propylene copolymer that is peroxide shifted to a final MFR 40 and which displays a FOG value of 655 µg/g to the sample IS1 (final heterophasic propylene copolymer), which has a FOG value of 333 µg/g and a MFR value of 41 dg/min (see Table 3).

In addition, as is shown in Table 4, the addition of talc does not have any influence on the FOG value.

Therefore, the present invention demonstrates that heterophasic propylene copolymers combining high melt flow and low FOG emissions can for example be produced in the two-step process of the invention, wherein step I is performed in the presence of a catalyst system comprising a Ziegler-Natta catalyst and at least one external electron donor chosen from the group of a compound having a structure according to Formula III $(R^{90})_2N\text{—}Si(OR^{91})_3$, a compound having a structure according to Formula IV: $(R^{92})Si(OR^{93})_3$ and mixtures thereof wherein each of $R^{90}$, $R^{91}$, $R^{92}$ and $R^{93}$ groups are each independently a linear, branched or cyclic, substituted or unsubstituted alkyl having between 1 and 10 carbon atoms, preferably wherein $R^{90}$, $R^{91}$, $R^{92}$ and $R^{93}$ groups are each independently a linear unsubstituted alkyl having between 1 and 8 carbon atoms, preferably ethyl, methyl or n-propyl, more preferably wherein the at least one external electron donor is chosen from the group of diethylaminotriethoxysilane (DEATES), n-propyl triethoxysilane, (nPTES), n-propyl trimethoxysilane (nPTMS) and mixtures thereof.

The invention claimed is:

1. A heterophasic propylene copolymer consisting of a propylene-based matrix and a dispersed ethylene-α-olefin copolymer, wherein the heterophasic propylene copolymer has a melt flow rate of at least 40 g/10 min as determined in accordance with ISO 1133 (230° C., 2.16 kg) and a FOG value of at most 350 µg/g as determined by VDA 278.

2. The heterophasic propylene copolymer according to claim 1, which heterophasic propylene copolymer is obtained by visbreaking of an intermediate heterophasic propylene copolymer in a shifting ratio, which complies with the following formula:

$$0.0011x^2-0.011x+1 \leq \text{shifting ratio} \leq -0.0009x^2+0.1963x+1$$

wherein x stands for the melt flow rate of the final heterophasic propylene copolymer obtained after visbreaking of the intermediate heterophasic propylene copolymer, wherein the shifting ratio is the melt flow rate of the final heterophasic propylene copolymer divided by the melt flow rate of the intermediate heterophasic propylene copolymer, wherein the melt flow rates are determined in accordance with ISO1133 (230° C., 2.16 kg).

3. The heterophasic propylene copolymer according to claim 1, wherein the heterophasic propylene copolymer consists of (a) a propylene-based matrix,
wherein the propylene-based matrix consists of a propylene homopolymer and/or a propylene-α-olefin copolymer consisting of at least 70 wt % of propylene and at most 30 wt % of α-olefin, based on the total weight of the propylene-based matrix and
wherein the propylene-based matrix is present in an amount of 60 to 95 wt % based on the total heterophasic propylene copolymer and (b) a dispersed ethylene-α-olefin copolymer,
wherein the dispersed ethylene-α-olefin copolymer is present in an amount of 40 to 5 wt % based on the total heterophasic propylene copolymer and
wherein the sum of the total amount of propylene-based matrix and total amount of the dispersed ethylene-α-olefin copolymer in the heterophasic propylene copolymer is 100 wt %.

4. The heterophasic propylene copolymer according to claim 1, wherein the amount of ethylene in the ethylene-α-olefin copolymer is in the range of 20-65 wt % based on the ethylene-α-olefin copolymer.

5. The heterophasic propylene copolymer according to claim 1, wherein the propylene-based matrix consists of a propylene homopolymer.

6. The heterophasic propylene copolymer according to claim 1, wherein the α-olefin in the ethylene-α-olefin copolymer is chosen from the group of α-olefins having 3 to 8 carbon atoms and any mixtures thereof.

7. The heterophasic propylene copolymer according to claim 1, wherein the melt flow rate of the heterophasic propylene copolymer is at most 90 dg/min (ISO 1133, 230° C., 2.16 kg).

8. The heterophasic propylene copolymer according to claim 1, wherein the heterophasic propylene copolymer is prepared by a catalyst system comprising a Ziegler-Natta catalyst and at least one external electron donor chosen from the group of a compound having a structure according to Formula III $(R^{90})_2N—Si(OR^{91})_3$, a compound having a structure according to Formula IV: $(R^{92})Si(OR^{93})_3$ and mixtures thereof, wherein each of $R^{90}$, $R^{91}$, $R^{92}$, and $R^{93}$, groups are each independently a linear, branched or cyclic, substituted or unsubstituted alkyl having between 1 and 10 carbon atoms.

9. A process for the manufacture of a heterophasic propylene copolymer of claim 1, comprising the sequential steps of:
I) polymerizing monomers to obtain an intermediate heterophasic propylene copolymer having an intermediate melt flow rate and
II) visbreaking said intermediate heterophasic propylene copolymer to obtain the heterophasic propylene copolymer having said target melt flow rate and said FOG value and wherein the ratio of the target melt flow rate to the intermediate melt flow rate is more than 1,
wherein step I) is performed in the presence of a catalyst system comprising a Ziegler-Natta catalyst and at least one external electron donor chosen from the group consisting of a compound having a structure according to Formula III $(R^{90})_2N—Si(OR^{91})_3$, a compound having a structure according to Formula IV: $(R^{92})Si(OR^{93})_3$ and mixtures thereof
wherein each of $R^{90}$, $R^{91}$, $R^{92}$, and $R^{93}$, groups are each independently a linear, branched or cyclic, substituted or unsubstituted alkyl having between 1 and 10 carbon atoms.

10. The process according to claim 9, wherein the propylene-based matrix of the intermediate propylene copolymer has a melt flow rate of at most 70 dg/min (ISO 1133, 230° C., 2.16 kg) and/or wherein the intermediate heterophasic propylene copolymer has a melt flow rate of at most 30 dg/min (ISO 1133, 230° C., 2.16 kg).

11. The process according to claim 9, wherein the catalyst system is obtained by
a catalyst preparation process comprising:
A) providing a procatalyst obtainable via a process comprising:
i) contacting a compound $R^4{}_zMgX^4{}_{2-z}$ with an alkoxy- or aryloxy-containing silane compound to give a first intermediate reaction product, being a solid $Mg(OR^1)_xX^1{}_{2-x}$, wherein: $R^4$ is the same as $R^1$ being a linear, branched or cyclic hydrocarbyl group independently selected from alkyl, alkenyl, aryl, aralkyl, alkoxycarbonyl or alkylaryl groups, and one or more combinations thereof; $X^4$ and $X^1$ are each independently selected from the group of consisting of fluoride (F—), chloride (Cl—), bromide (Br—) or iodide (I—); z is in a range of larger than 0 and smaller than 2, being 0<z<2;
ii) optionally contacting the solid $Mg(OR^1)_xX_{2-x}$ obtained in step i) with at least one activating compound selected from the group formed of activating electron donors and metal alkoxide compounds of formula $M^1(OR^2)_{v-w}(OR^3)_w$ or $M^2(OR^2)_{v-w}(R^3)_w$, to obtain a second intermediate product; wherein $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof;
iii) contacting the first or second intermediate reaction product, obtained respectively in step i) or ii), with a halogen-containing Ti-compound and optionally an internal electron donor to obtain said procatalyst;
B) contacting said procatalyst with a co-catalyst and the at least one external electron donor;
a catalyst preparation process comprising the steps of reacting titanium tetrachloride, diisobutyl phthalate, and magnesium diethoxide, and then titanium tetrachloride and phthaloyl chloride and again titanium tetrachloride or
a catalyst preparation process comprising the steps of reacting a magnesium-containing species, a transition metal halide and an organosilane, again with transition metal compound and an electron donor.

12. The process according to claim 9, wherein the catalyst system is obtained by a catalyst preparation process comprising the steps of reacting titanium tetrachloride, diisobutyl phthalate, and magnesium diethoxide, and then titanium tetrachloride and phthaloyl chloride and again titanium tetrachloride or wherein the catalyst system is obtained by a catalyst preparation process comprising the steps of reacting a magnesium-containing species, a transition metal halide and an organosilane, again with transition metal compound and an electron donor.

13. The process for the preparation of a heterophasic propylene copolymer according to claim 1, comprising the step of visbreaking an intermediate heterophasic propylene copolymer in a shifting ratio, which complies with the following formula:

$$0.0011x^2-0.011x+1 \leq \text{shifting ratio} \leq -0.0009x^2+0.1963x+1$$

wherein x stands for the melt flow rate of the final heterophasic propylene copolymer obtained after visbreaking of the intermediate heterophasic propylene copolymer,
wherein the shifting ratio is the melt flow rate of the final heterophasic propylene copolymer divided by the melt flow rate of the intermediate heterophasic propylene copolymer, to obtain the heterophasic propylene copolymer, and
wherein the melt flow rate is determined in accordance with ISO1133 (230° C., 2.16 kg).

14. An article comprising the heterophasic propylene copolymer according to claim 1.

15. The process according to claim 9, wherein the propylene-based matrix of the intermediate propylene copolymer has a melt flow rate of at most 45 dg/min (ISO 1133, 230° C., 2.16 kg) and/or wherein the intermediate heterophasic propylene copolymer has a melt flow rate of at most 20 dg/min (ISO 1133, 230° C., 2.16 kg) and the melt flow rate of the intermediate heterophasic propylene copolymer is at least 2 dg/min.

16. The process according to claim 9, wherein $R^{90}$, $R^{91}$, $R^{92}$, and $R^{93}$, groups are each independently a linear unsubstituted alkyl having between 1 and 8 carbon atoms, and
wherein step I) involves
ia) polymerizing propylene and optionally α-olefin in the presence of the catalyst system to obtain the propylene-based matrix, and
ib) subsequently polymerizing ethylene and α-olefin in the propylene-based matrix in the presence of the catalyst system to obtain the dispersed ethylene-α olefin copolymer.

17. The process according to claim 16, wherein the linear unsubstituted alkyl comprises ethyl, methyl or n-propyl.

18. The process according to claim 16, wherein the at least one external electron donor is chosen from the group of diethylaminotriethoxysilane (DEATES), n-propyl triethoxysilane (nPTES), n-propyl trimethoxysilane (nPTMS) and mixtures thereof.

19. The article of claim 14, wherein the article is an automotive interior article selected from instrument panel carriers, door panels, dashboards, dashboard carriers, door claddings, door fixtures, armrests, pillar cladding, seat cladding, boot cladding, interior trims and applications in heating, ventilation, air conditioning applications.

20. The heterophasic propylene copolymer according to claim 7, wherein the melt flow rate of the heterophasic propylene copolymer is at most 80 dg/min (ISO 1133, 230° C., 2.16 kg).

21. The heterophasic propylene copolymer according to claim 20, wherein the melt flow rate of the heterophasic propylene copolymer is at most 70 dg/min (ISO 1133, 230° C., 2.16 kg).

* * * * *